US012672053B2

(12) United States Patent
Watfa

(10) Patent No.: US 12,672,053 B2
(45) Date of Patent: Jun. 30, 2026

(54) METHOD AND APPARATUS FOR NETWORK SLICE REGISTRATION

(71) Applicant: Samsung Electronics Co., Ltd.,
Suwon-si (KR)

(72) Inventor: Mahmoud Watfa, Staines (GB)

(73) Assignee: Samsung Electronics Co., Ltd.,
Suwon-si (KR)

( * ) Notice: Subject to any disclaimer, the term of this patent is extended or adjusted under 35 U.S.C. 154(b) by 277 days.

(21) Appl. No.: 18/016,824

(22) PCT Filed: Jul. 22, 2021

(86) PCT No.: PCT/KR2021/009510
§ 371 (c)(1),
(2) Date: Jan. 18, 2023

(87) PCT Pub. No.: WO2022/019689
PCT Pub. Date: Jan. 27, 2022

(65) Prior Publication Data
US 2023/0300730 A1 Sep. 21, 2023

(30) Foreign Application Priority Data
Jul. 22, 2020 (GB) ..................................... 2011364

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC ..... H04W 48/18; H04W 48/16; H04W 48/02; H04W 4/50; H04W 12/082; H04W 60/04; H04W 12/06; H04L 41/0806
See application file for complete search history.

(56) References Cited

U.S. PATENT DOCUMENTS

2019/0029065 A1 * 1/2019 Park ...................... H04W 60/00
2019/0373441 A1 12/2019 Ryu et al.
(Continued)

FOREIGN PATENT DOCUMENTS

CN        110214459 A       9/2019
EP            3643098 B1 *   8/2025   ............ H04W 48/18
(Continued)

OTHER PUBLICATIONS

Great Britain Office Action dated Apr. 9, 2024, issued in Great Britain Patent Application No. 2218324.8.
(Continued)

*Primary Examiner* — Julio R Perez

(74) *Attorney, Agent, or Firm* — Jefferson IP Law, LLP

(57) ABSTRACT

The present disclosure relates to a pre-5th-generation (5G) or 5G communication system to be provided for supporting higher data rates Beyond 4th-generation (4G) communication system such as long term evolution (LTE). A first method performed by a network entity is disclosed, the method comprising: in case that there is pending network slice selection assistance information (NSSAI) that includes at least one second single NSSAI (S-NSSAI) for a user equipment (UE), receiving, from the UE, a request message including requested NSSAI including at least one first S-NSSAI over a first access type; and transmitting, to the UE, the pending NSSAI including the at least one first S-NSSAI, wherein the at least one first S-NSSAI is different from the at least one second S-NSSAI.

8 Claims, 5 Drawing Sheets

(56) References Cited

U.S. PATENT DOCUMENTS

| | | | |
|---|---|---|---|
| 2020/0077327 A1 | 3/2020 | Duan et al. | |
| 2020/0137552 A1* | 4/2020 | Park | H04W 8/08 |
| 2020/0162919 A1 | 5/2020 | Velev et al. | |
| 2020/0163010 A1 | 5/2020 | Qiao et al. | |
| 2020/0267554 A1 | 8/2020 | Faccin et al. | |
| 2020/0413244 A1* | 12/2020 | Park | H04W 76/27 |
| 2021/0160769 A1 | 5/2021 | Tiwari et al. | |
| 2021/0195509 A1* | 6/2021 | Ohlsson | H04W 12/037 |
| 2021/0306972 A1 | 9/2021 | Watfa | |
| 2021/0368339 A1 | 11/2021 | Watfa et al. | |
| 2022/0078870 A1* | 3/2022 | Park | H04W 8/08 |
| 2022/0110050 A1 | 4/2022 | Won et al. | |
| 2022/0256448 A1* | 8/2022 | Tamura | H04W 76/11 |
| 2022/0256450 A1 | 8/2022 | Kuge | |
| 2022/0295279 A1 | 9/2022 | Kuge | |
| 2022/0394607 A1* | 12/2022 | Ramle | H04L 41/0806 |
| 2023/0189187 A1 | 6/2023 | Velev et al. | |
| 2023/0300730 A1* | 9/2023 | Watfa | H04W 4/50 455/434 |

FOREIGN PATENT DOCUMENTS

| | | | | |
|---|---|---|---|---|
| WO | 2018/034249 A1 | 2/2019 | | |
| WO | WO-2022180617 A1 * | 9/2022 | | H04W 12/084 |

OTHER PUBLICATIONS

Great Britain Combined Search and Examination Report dated Mar. 7, 2023, issued in Great Britain Application No. GB2218324.8.

Extended European Search Report dated Sep. 25, 2023, issued in European Patent Application No. 21846660.5.

3rd Generation Partnership Project; Technical Specification Group Services and System Aspects; System architecture for the 5G System (5GS); Stage 2 (Release 16), 3GPP TS 23.501 V16.5.0, Jul. 9, 2020.

5G; Procedures for the 5G System (5GS), 3GPP TS 23.502 V16.5.0 Release 16, Jul. 1, 2020.

5G; Non-Access-Stratum (NAS) protocol for 5G System (5GS); Stage 3, 3GPP TS 24.501 V16.5.1, Release 16, Aug. 1, 2020.

Huawei et al., Inclusion of pending S-NSSAI(s) in the requested NSSAI, C1-202473, 3GPP TSG-CT WG1 Meeting #123-e, Apr. 17, 2020, Electronic meeting.

Samsung et al., Storage of pending NSSAI, C1-203965, 3GPP TSG-CT WG1 Meeting #124-e, Jun. 8, 2020, Electronic meeting.

Ericsson, Request S-NSSAI pending the NW slice-specific authentication and authorization, C1-202250, 3GPP TSG-CT WG1 Meeting #123-e, Apr. 9, 2020, Electronic meeting.

Third Generation Partnership Project, C1-202006, Draft Meeting Report for TSG CT WG1 meeting: 122e, Feb. 20, 2020.

CT1, LS on handling pending NSSAI during ongoing NSSAA, C1-202474, 3GPP TSG CT WG1 Meeting 123-e, Apr. 16, 2020, Electronic meeting.

Huawei et al., Discussion on including pending S-NSSAI(s) in the requested Nssai, C1-202472, 3GPP TSG CT WG1 Meeting #123-e, Apr. 16, 2020, Electronic meeting.

GB Examination Report dated Dec. 22, 2020, issued in GB Application No. GB2011364.3.

International Search Report dated Oct. 29, 2021, issued in International Application No. PCT/KR2021/009510.

Chinese Office Action dated May 1, 2025, issued in Chinese Patent Application No. 202180059550.9.

European Office Action dated Jul. 9, 2025, issued in a European Patent Application No. 21 846 660.5.

Japanese Office Action dated Jul. 29, 2025, issued in a Japanese Patent Application No. 2023-504337.

Chinese Office Action dated Dec. 18, 2025, issued in a Chinese Patent Application No. 202180059550.9.

ETSI TS 124 501 V15.3.0, 5G; Non-Access-Stratum (NAS) protocol for 5G System (568); Stage 3 (3GPP TS 24.501 version 15.3.0 Release 15), May 1, 2019.

InterDigital; Introduction of pending NSSAI for network slice-specific authentication and authorization, 3GPP TSG-CT1 Meeting #120; C1-196089, Oct. 7, 2019.

* cited by examiner

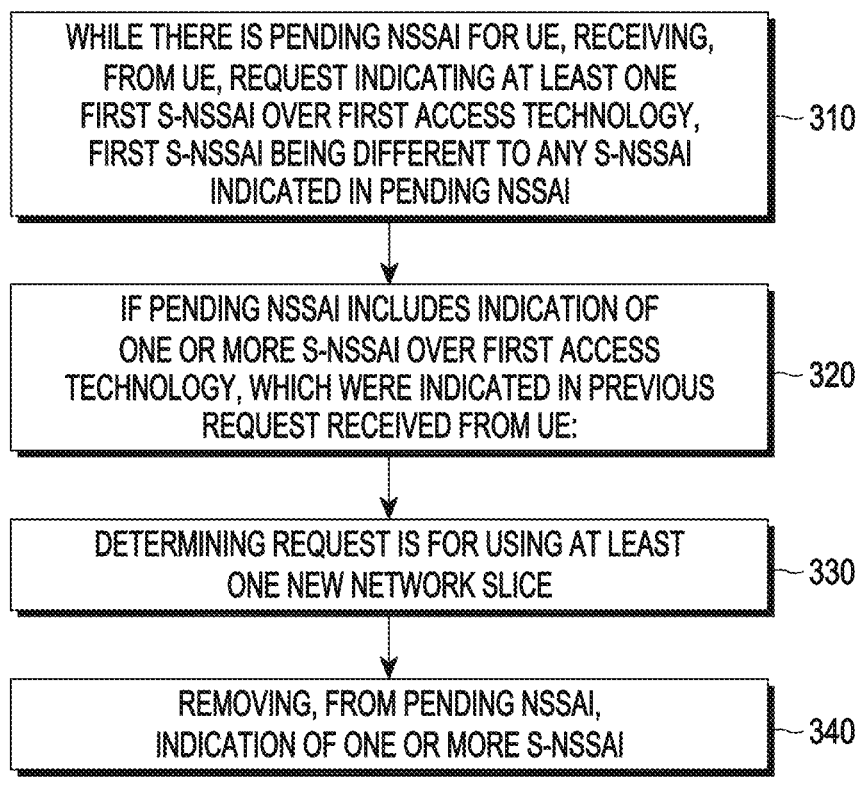

WHILE THERE IS PENDING NSSAI FOR UE, RECEIVING, FROM UE, REQUEST INDICATING AT LEAST ONE FIRST S-NSSAI OVER FIRST ACCESS TECHNOLOGY, FIRST S-NSSAI BEING DIFFERENT TO ANY S-NSSAI INDICATED IN PENDING NSSAI ~ 310

IF PENDING NSSAI INCLUDES INDICATION OF ONE OR MORE S-NSSAI OVER FIRST ACCESS TECHNOLOGY, WHICH WERE INDICATED IN PREVIOUS REQUEST RECEIVED FROM UE: ~ 320

DETERMINING REQUEST IS FOR USING AT LEAST ONE NEW NETWORK SLICE ~ 330

REMOVING, FROM PENDING NSSAI, INDICATION OF ONE OR MORE S-NSSAI ~ 340

FIG.3

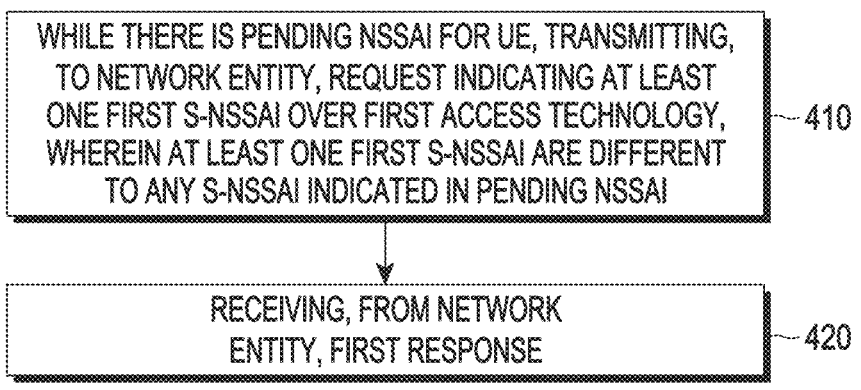

WHILE THERE IS PENDING NSSAI FOR UE, TRANSMITTING, TO NETWORK ENTITY, REQUEST INDICATING AT LEAST ONE FIRST S-NSSAI OVER FIRST ACCESS TECHNOLOGY, WHEREIN AT LEAST ONE FIRST S-NSSAI ARE DIFFERENT TO ANY S-NSSAI INDICATED IN PENDING NSSAI — 410

RECEIVING, FROM NETWORK ENTITY, FIRST RESPONSE — 420

FIG.4

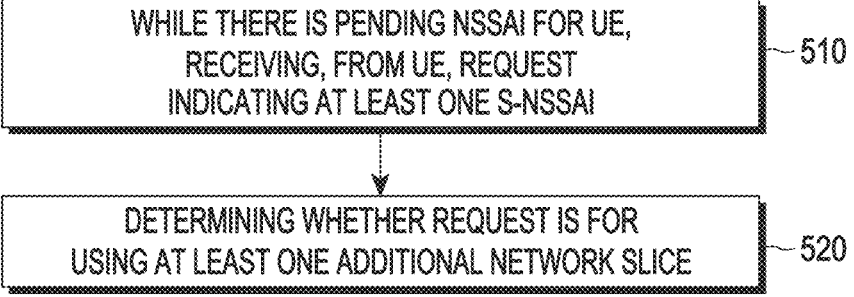

WHILE THERE IS PENDING NSSAI FOR UE, RECEIVING, FROM UE, REQUEST INDICATING AT LEAST ONE S-NSSAI — 510

DETERMINING WHETHER REQUEST IS FOR USING AT LEAST ONE ADDITIONAL NETWORK SLICE — 520

FIG.5

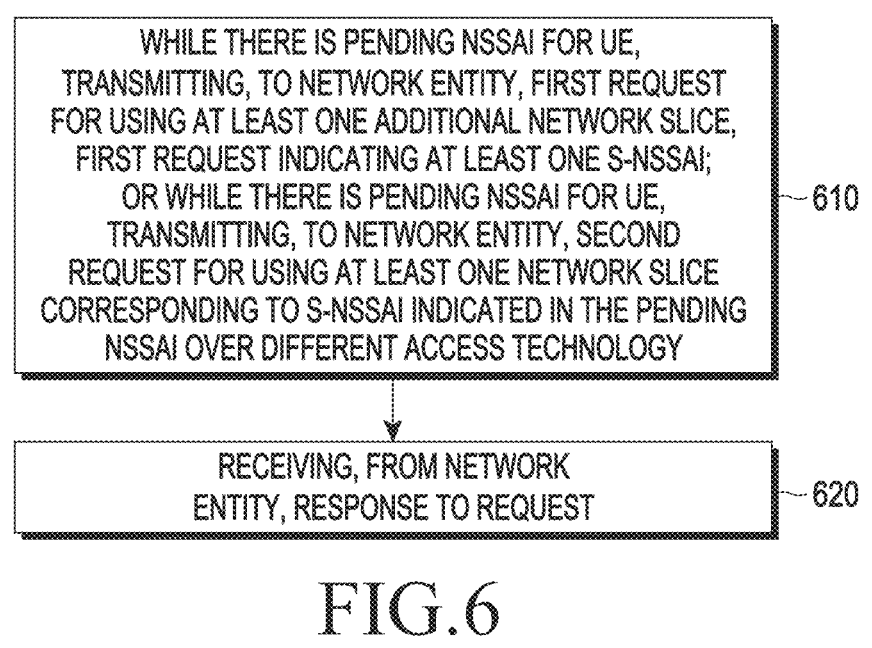

WHILE THERE IS PENDING NSSAI FOR UE,
TRANSMITTING, TO NETWORK ENTITY, FIRST REQUEST
FOR USING AT LEAST ONE ADDITIONAL NETWORK SLICE,
FIRST REQUEST INDICATING AT LEAST ONE S-NSSAI;
OR WHILE THERE IS PENDING NSSAI FOR UE,
TRANSMITTING, TO NETWORK ENTITY, SECOND
REQUEST FOR USING AT LEAST ONE NETWORK SLICE
CORRESPONDING TO S-NSSAI INDICATED IN THE PENDING
NSSAI OVER DIFFERENT ACCESS TECHNOLOGY          ~610

RECEIVING, FROM NETWORK
ENTITY, RESPONSE TO REQUEST          ~620

FIG.6

METHOD AND APPARATUS FOR NETWORK SLICE REGISTRATION

CROSS-REFERENCE TO RELATED APPLICATION(S)

This application is a U.S. National Stage application under 35 U.S.C. § 371 of an International application number PCT/KR2021/009510, filed on Jul. 22, 2021, which is based on and claims priority of a United Kingdom application number 2011364.3, filed on Jul. 22, 2020, in the United Kingdom Intellectual Property Office, the disclosure of which is incorporated by reference herein in its entirety.

TECHNICAL FIELD

The present disclosure relates to methods, apparatus, and systems for registering to network slices. Further, certain examples of the present disclosure provide methods, apparatus and systems for registering to additional network slices during network slice-specific authentication and authorization in 3GPP 5G. Further, certain examples of the present disclosure provide methods, apparatus and systems for conditionally performing NSSAA.

BACKGROUND ART

Herein, the following documents are referenced:
[1] 3GPP TS 23.501 V16.5.0
[2] 3GPP TS 23.502 V16.5.0
[3] 3GPP TS 24.501 V16.5.0

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In 3GPP 5GS (3rd Generation Partnership Project 5th Generation System), the following are defined (e.g. in [1]). A Network Slice (NS) is defined as a logical network that provides specific network capabilities and network characteristics. A Network Slice Instance (NSI) is defined as a set of Network Function instances and the required resources (e.g. compute, storage and networking resources) which form a deployed NS. A Network Function (NF) is defined as a 3GPP adopted or 3GPP defined processing function in a network, which has defined functional behaviour and 3GPP defined interfaces.

A NS may be identified by Single Network Slice Selection Assistance Information (S-NSSAI).

Overview of Network Slice-Specific Authentication and Authorization

Network slice-specific authentication and authorization (NSSAA) was introduced as part of Rel-16 in 3GPP. The feature enables the network to perform slice-specific authentication and authorization for a set of S-NSSAI(s) (single network slice selection assistance information (NSSAI)) to ensure that the user is allowed to access these slices. The procedure is executed after the 5G mobility management (5GMM) authentication procedure has been completed and also after the registration procedure completes. The high-level description of the feature can be found in [1] whereas further details can be found in [2] and [3]. The key points about the NSSAA procedure are summarized in this section.

NSSAA applies to both the 3GPP access and the non-3GPP access and is in fact access agnostic. That is, if a slice is successfully authorized, then it is considered as authorized for both access types (i.e. 3GPP and non-3GPP access type). The term "authorized" may be regarded as meaning that slice-specific authentication/authorization has succeeded for a particular S-NSSAI. However this does not mean that the S-NSSAI is allowed to be used in the current tracking area (TA) of the user equipment (UE) over the 3GPP access.

When a set of slices, each of which is identified by an S-NSSAI, is subject to NSSAA during registration procedure, the AMF will send the pending NSSAI to the UE in the Registration Accept message indicating these S-NSSAIs for which NSSAA will be performed (or for which NSSAA is needed).

The access and mobility management function (AMF), due to a need to perform NSSAA, may not send an allowed NSSAI to the UE in the Registration Accept message. In this case, the AMF sets the "NSSAA to be performed" indicator in the 5GS registration result IE set to "Network slice-specific authentication and authorization is to be performed", in addition to sending the pending NSSAI to the UE.

There are some cases in which the UE may be allowed to use some slices without needing to run NSSAA again e.g. because the slices don't require NSSAA, or the slices have been subject to NSSAA already. In this case, the AMF will send the allowed NSSAI in the Registration Accept, where the allowed NSSAI contains these S-NSSAIs for which NSSAA is not required. However, there may be other slices that do require NSSAA for which the AMF will send the pending NSSAI in the Registration Accept message, where the pending NSSAI contains the S-NSSAIs that require NSSAA. There is a requirement that prohibits the UE from sending a requested NSSAI with any S-NSSAI that is part of the pending NSSAI.

It should be noted that since Rel-15 (i.e., before NSSAA was introduced), the UE initiates a registration procedure when it needs to change the slice(s) it is currently registered to as specified in TS 24.501. In fact this is explicitly captured as a trigger for sending the Registration Request by the UE in section 5.5.1.3.2 of [3]:

"i) when the LIE needs to change the slice(s) it is currently registered to"

Therefore, when the UE needs to change the slice(s) it is currently registered to, the UE will send the Registration Request and include the Requested NSSAI IE in the message.

It should be noted that the current Access and Mobility Management Function (AMF) behaviour is that it considers the requested NSSAI that was last received as the set of S-NSSAIs that the user equipment (UE) wants to use. For example, if the UE sends a Registration Request with a requested NSSAI at time T1 then the AMF considers the entries of the requested NSSAI that was sent by the UE at T1 to be the latest set of S-NSSAIs that the UE wants to use. If the UE then sends a Registration Request with a requested NSSAI at time T2 then the AMF considers the entries of the requested NSSAI that was sent by the UE at T2 to be the latest set of S-NSSAIs that the UE wants to use.

Note that the requested NSSAI sent at time T2 may contain some entries from the requested NSSAI at time T1, however what is important to note is that the AMF considers the last received requested NSSAI (i.e. at time T2 in this example) to contain the S-NSSAIs that the UE needs to use and therefore will consider any previous requested NSSAI from the UE e.g. at time T1, to be invalid.

With the above, the following example may be useful:

At time T1, the UE may send a requested NSSAI={A, B}, for S-NSSAIs {A, B}.

At time T2, the UE may need to register to a new set of slices. If the UE still needs to use say S-NSSAI B, then the UE should ensure that the new requested NSSAI will contain entry B. Hence, if for example the UE needs to use S-NSSAIs {B, C}, then the UE should send the requested NSSAI set to {B, C}.

When the AMF receives the requested NSSAI {B, C}, the AMF considers that the previous requested NSSAI {A, B}, which may have a corresponding allowed NSSAI {A, B}, is no longer required by the UE and the AMF then processes the requested NSSAI {B, C} to determine if this can be allowed. It should be noted that any previous allowed NSSAI based on {A, B} will no longer be valid from this point onward due to the new requested NSSAI containing {B, C}.

Allowing the Use of Specific Slices Based on Registration Area

Prior to NSSAA, network slicing uses an allowed NSSAI to indicate the S-NSSAIs that are allowed for use by the UE in its current registration area (RA) (and for the current serving public land mobile network (PLMN)). However, it is possible that some slices are not available, or are not allowed, in the UE's current RA. But this does not mean that the slices are altogether not allowed in the current serving PLMN. Hence, a slice may not be available or may not be allowed in a RA, say Area 1, but the slice may be available or be allowed in another RA, say Area 2, of the same serving PLMN.

If an S-NSSAI in the requested NSSAI is not allowed for a UE in the current RA, the AMF includes the S-NSSAI in the rejected NSSAI and sets the associated cause to "S-NSSAI not available in the current registration area". This means that the UE may be able to use the same slice when the UE enters a different RA.

On the other hand, if an S-NSSAI which was requested by the UE is not allowed for use in the entire PLMN, regardless of the RA, then the AMF will include the S-NSSAI in the rejected NSSAI and sets the associated cause to "S-NSSAI not available in the current PLMN or SNPN". This means that the UE will not be able to use the slice in the current PLMN regardless of the RA.

It should be noted that NSSAA comes as an addition to network slicing, wherein the network has to additionally verify if the slice is subject to NSSAA and if yes then the network runs NSSAA.

DISCLOSURE OF INVENTION

Solution to Problem

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

In accordance with an aspect of the present disclosure, there is provided a method of a network entity, the method comprising: while there is a pending network slice selection assistance information (NSSAI) for a user equipment (UE), receiving, from the UE, a request indicating at least one first single NSSAI (S-NSSAI) over a first access technology; if the pending NSSAI includes an indication of one or more S-NSSAI over the first access technology, which were indicated in a previous request received from the UE: determining the request is for using at least one new network slice, and removing, from the pending NSSAI, the indication of the one or more S-NSSAI; wherein the at least one first S-NSSAI are different to any S-NSSAI indicated in the pending NSSAI.

In certain embodiments of the present disclosure, the method further comprises: determining whether one or more of the at least one first S-NSSAI are subject to network slice-specific authentication and authorization (NSSAA);

and if so, adding an indication of the one or more of the at least one first S-NSSAI to the pending NSSAI.

In certain embodiments of the present disclosure, the method further comprises: transmitting the pending NSSAI including the indication of the one or more of the at least one first S-NSSAI to the UE; or transmitting an additional pending NSSAI including the indication of the one or more of the at least one first S-NSSAI to the UE.

In certain embodiments of the present disclosure, the pending NSSAI includes an indication of at least one second S-NSSAI which were indicated in a previous request, received from the UE, over a second access technology different to the first access technology.

In certain embodiments of the present disclosure, the method further comprises: maintaining, in the pending NSSAI, the indication of the at least one second S-NSSAI.

In certain embodiments of the present disclosure, the method further comprises one or more of: transmitting an allowed NSSAI to the UE, the allowed NSSAI including information on S-NSSAI previously allowed for the UE and information on one or more of the at least one first S-NSSAI determined to be allowed for the UE, or transmitting an additional allowed NSSAI to the UE, the additional allowed NSSAI including the information on the one or more of the at least one first S-NSSAI determined to be allowed for the UE; and if it is determined that one or more of the at least one first S-NSSAI are not allowed for the UE or are not available in a current registration area (RA) of the UE, transmitting, to the UE, a rejected NSSAI including an indication of the one or more of the at least one first S-NSSAI which are not allowed for the UE or which are not available in the current RA of the UE.

In certain embodiments of the present disclosure, for each S-NSSAI indicated in the pending NSSAI, the network entity stores a record of the access technology for which use of said S-NSSAI was requested.

In accordance with another aspect of the present disclosure, there is provided a method of a UE, the method comprising: while there is a pending network slice selection assistance information (NSSAI) for a user equipment (UE), transmitting, to a network entity, a request indicating at least one first single NSSAI (S-NSSAI) over a first access technology; wherein the request is a request for using at least one new network slice if the pending NSSAI includes an indication of one or more S-NSSAI over the first access technology, which were indicated in a previous request transmitted by the UE; and wherein the at least one first S-NSSAI are different to any S-NSSAI indicated in the pending NSSAI.

In certain embodiments of the present disclosure, the method further comprises receiving, from the network entity, a response to the request.

In certain embodiments of the present disclosure, if the request is the request for using at least one new network slice, the method further comprises: removing, from the pending NSSAI, the indication of the one or more S-NSSAI, based on the response.

In certain embodiments of the present disclosure, the method further comprises: based on the received response, modifying the pending NSSAI to include an indication of one or more of the at least one first S-NSSAI which are subject to network slice-specific authentication and authorization (NSSAA).

In certain embodiments of the present disclosure, the received response includes a pending NSSAI including the indication of one or more of the at least one first S-NSSAI which are subject to NSSAA; or the received response includes an additional pending NSSAI including the indication of one or more of the at least one first S-NSSAI which are subject to NSSAA.

In certain embodiments of the present disclosure, the method further comprises, in response to the received response, maintaining, in the pending NSSAI, an indication of any of the at least one second S-NSSAI for which NSSAA is not completed.

In certain embodiments of the present disclosure, the response includes at least one of: an allowed NSSAI including information on S-NSSAI previously allowed for the UE and information on one or more of the at least one first S-NSSAI allowed for the UE, or an additional allowed NSSAI including the information on the one or more of the at least one first S-NSSAI allowed for the UE; and a rejected NSSAI including an indication of one or more of the at least one first S-NSSAI which are not allowed for the UE or which are not available in a current registration area of the UE.

In certain embodiments of the present disclosure, the pending NSSAI includes an indication of at least one second S-NSSAI over a second access technology different to the first access technology, which were indicated in a previous request transmitted to the network entity from the UE.

In accordance with another aspect of the present disclosure, there is provided a method of a network entity, the method comprising: while there is a pending network slice selection assistance information (NSSAI) for a user equipment (UE), receiving, from the UE, a request indicating at least one single NSSAI (S-NSSAI); and determining whether the request is for using at least one additional network slice.

In certain embodiments of the present disclosure, it is determined that the request is for using at least one additional network slice if: the request includes a requested NSSAI; the request includes an additional requested NSSAI; or the network entity receives, from the UE, an indication that the request is for using at least one additional network slice.

In certain embodiments of the present disclosure, the request is for using at least one network slice corresponding to an S-NSSAI indicated in the pending NSSAI over the same or a different access technology.

In certain embodiments of the present disclosure, the at least one S-NSSAI are different to any S-NSSAI indicated in the pending NSSAI.

In certain embodiments of the present disclosure, the method further comprises: determining whether one or more of the at least one S-NSSAI are subject to network slice-specific authentication and authorization (NSSAA); and if so, adding an indication of the one or more of the at least one S-NSSAI to the pending NSSAI.

In certain embodiments of the present disclosure, the method further comprises: transmitting the pending NSSAI including the indication of the one or more of the at least one S-NSSAI to the UE; or transmitting an additional pending NSSAI including the indication of the one or more of the at least one S-NSSAI to the UE.

In certain embodiments of the present disclosure, the method further comprises one or more of: transmitting an allowed NSSAI to the UE, the allowed NSSAI including information on S-NSSAI previously allowed for the UE and information on one or more of the at least one S-NSSAI determined to be allowed for the UE, or transmitting an additional allowed NSSAI to the UE, the additional allowed NSSAI including the information on the one or more of the at least one S-NSSAI determined to be allowed for the UE;

and if it is determined that one or more of the at least one S-NSSAI are not allowed for the UE or are not available in a current registration area (RA) of the UE, transmitting, to the UE, a rejected NSSAI including an indication of the one or more of the at least one S-NSSAI which are not allowed for the UE or which are not available in the current RA of the UE.

In certain embodiments of the present disclosure, if the request is for using at least one additional network slice, the method further comprises: processing the request without removing an indication of an S-NSSAI from the pending NSSAI.

In accordance with another aspect of the present disclosure, there is provided a method of a UE, the method comprising: while there is a pending network slice selection assistance information (NSSAI) for a user equipment (UE), transmitting, to a network entity, a first request for using at least one additional network slice, the first request indicating at least one single NSSAI (S-NSSAI); or, while there is the pending NSSAI for the UE, transmitting, to the network entity, a second request for using at least one network slice corresponding to an S-NSSAI indicated in the pending NSSAI over the same or a different access technology.

In certain embodiments of the present disclosure, use of the at least one additional network slice is requested in addition to use of one or more network slices corresponding to one or more S-NSSAI indicated in the pending NSSAI.

In certain embodiments of the present disclosure, at least one of: the first request is a requested NSSAI, or an additional requested NSSAI; and the UE transmits, to the network entity, an indication that the first request is for using at least one additional network slice.

In certain embodiments of the present disclosure, the method further comprises receiving, from the network entity, a response to the first request.

In certain embodiments of the present disclosure, the method further comprises: based on the received response, modifying the pending NSSAI to include an indication of one or more of the at least one first S-NSSAI which are subject to network slice-specific authentication and authorization (NSSAA).

In certain embodiments of the present disclosure, the received response includes a pending NSSAI including the indication of one or more of the at least one first S-NSSAI which are subject to NSSAA; or the received response includes an additional pending NSSAI including the indication of one or more of the at least one first S-NSSAI which are subject to NSSAA.

In certain embodiments of the present disclosure, the method further comprises: in response to the received response, maintaining, in the pending NSSAI, an indication of any S-NSSAI corresponding to a previously requested network slice for which NSSAA is not completed.

In certain embodiments of the present disclosure, the response comprises at least one of: an allowed NSSAI including information on S-NSSAI previously allowed for the UE and information on one or more of the at least one S-NSSAI allowed for the UE, or an additional allowed NSSAI including the information on the one or more of the at least one S-NSSAI allowed for the UE; and a rejected NSSAI including an indication of one or more of the at least one S-NSSAI which are not allowed for the UE or which are not available in a current registration area of the UE.

In accordance with another aspect of the present disclosure, there is provided a method of a network entity, the method comprising: determining whether a single network slice selection assistance information (S-NSSAI) is available or allowed for a user equipment (UE) based on a registration area (RA) of the UE, and if not, including the S-NSSAI in a rejected NSSAI without performing network slice-specific authentication and authorization (NSSAA) for the S-NSSAI; or performing NSSAA for the S-NSSAI, after performing NSSAA, determining whether the S-NSSAI is available or allowed for the UE based on the RA of the UE, and if not, including the S-NSSAI in the rejected NSSAI.

In certain embodiments of the present disclosure, the S-NSSAI is indicated in a request for use of a network slice received from the UE, or the S-NSSAI is marked as default in a subscription of the UE.

In certain embodiments of the present disclosure, it is determined that the S-NSSAI is not available or not allowed for the UE if the S-NSSAI is not available in the RA over a specific access technology.

In certain embodiments of the present disclosure, the method further comprises setting an indication that the reason for rejection is based on the RA.

In certain embodiments of the present disclosure, the method further comprises transmitting, to the UE, the rejected NSSAI and the indication.

In accordance with another aspect of the present disclosure, there is provided a network entity or UE configured to operate according to one or more of the methods recited above.

In accordance with another aspect of the present disclosure, there is provided a network comprising a network entity and/or a UE according to the previous paragraph.

In accordance with another aspect of the present disclosure, there is provided a computer program comprising instructions which, when the program is executed by a computer or processor, cause the computer or processor to carry out one or more of the methods recited above.

In accordance with another aspect of the present disclosure, there is provided a computer or processor-readable data carrier having stored thereon a computer program according to the previous paragraph.

In accordance with another aspect of the present disclosure, there is provided a method performed by a network entity, the method comprising: in case that there is pending network slice selection assistance information (NSSAI) that includes at least one second single NSSAI (S-NSSAI) for a user equipment (UE), receiving, from the UE, a request message including requested NSSAI including at least one first S-NSSAI over a first access type; and transmitting, to the UE, the pending NSSAI including the at least one first S-NSSAI, wherein the at least one first S-NSSAI is different from the at least one second S-NSSAI.

In certain embodiments of the present disclosure, the method further comprises in case that the pending NSSAI includes the at least one second S-NSSAI which was requested in a previous request message received from the UE: determining whether the at least one first S-NSSAI is subject to network slice-specific authentication and authorization (NSSAA); and in case that the at least one first S-NSSAI is subject to the NSSAA, adding the at least one first S-NSSAI to the pending NSSAI.

In certain embodiments of the present disclosure, the method further comprises determining whether the request message is for using at least one new network slice.

In certain embodiments of the present disclosure, wherein for each S-NSSAI in the pending NSSAI, the network entity stores a record of the first access type over which use of the S-NSSAI was requested.

In accordance with another aspect of the present disclosure, there is provided a method performed by a user equipment(UE), the method comprising: in case that there is a pending network slice selection assistance information (NSSAI) that includes at least one second single NSSAI (S-NSSAI) for a user equipment (UE), transmitting, to a network entity, a request message including requested NSSAI including at least one first S-NSSAI over a first access type; receiving, from the network entity, the pending NSSAI including the at least one first S-NSSAI. wherein the at least one first S-NSSAI is different from the at least one second S-NSSAI.

In certain embodiments of the present disclosure, wherein the at least one first S-NSSAI is added to the pending NSSAI in case that the pending NSSAI includes the at least one second S-NSSAI which were requested in a previous request transmitted by the UE and the at least one first S-NSSAI is subject to the network slice-specific authentication and authorization (NSSAA).

In accordance with another aspect of the present disclosure, there is provided a method performed by a network entity, the method comprising: in case that there is pending network slice selection assistance information (NSSAI) for a user equipment (UE), receiving, from the UE, a request message including requested NSSAI including at least one single NSSAI (S-NSSAI); and determining whether the request message is for using at least one additional network slice. In certain embodiments of the present disclosure, wherein the request message is for using at least one additional network slice in case that: the request message includes requested NSSAI; the request message includes additional requested NSSAI; or the network entity receives, from the UE, an indication that the request message is for using at least one additional network slice, and wherein the request message is for using at least one network slice corresponding to S-NSSAI in the pending NSSAI over a same or a different access type.

In certain embodiments of the present disclosure, the method further comprises determining whether the at least one S-NSSAI is subject to network slice-specific authentication and authorization (NSSAA); in case that the at least one S-NSSAI is subject to the NSSAA, adding the at least one S-NSSAI to the pending NSSAI.

In certain embodiments of the present disclosure, the method further comprising transmitting, to the UE, the pending NSSAI including the at least one S-NSSAI.

In certain embodiments of the present disclosure, wherein, in case that the request message is for using at least one additional network slice, the method further comprises: processing the request message without removing an S-NSSAI from the pending NSSAI.

In accordance with another aspect of the present disclosure, there is provided a method performed by a user equipment(UE), the method comprising: in case that there is a pending network slice selection assistance information (NSSAI) for the UE, transmitting, to a network entity, a first request message for using at least one additional network slice, the first request message including at least one single NSSAI (S-NSSAI), wherein use of the at least one additional network slice is requested in addition to use of one or more network slices corresponding to at least one S-NSSAI in the pending NSSAI.

In certain embodiments of the present disclosure, wherein at least one of: the first request message includes requested NSSAI, or additional requested NSSAI; and the UE transmits, to the network entity, an indication that the first request message is for using at least one additional network slice.

Various aspects, advantages, and salient features will become apparent to those skilled in the art from the following detailed description, taken in conjunction with the annexed drawings, which disclose examples of the present disclosure.

BRIEF DESCRIPTION OF DRAWINGS

Embodiments of the invention are further described hereinafter with reference to the accompanying drawings, in which:

FIG. 3 illustrates a method of a network entity in accordance with an example of the present disclosure.

FIG. 4 illustrates a method of a UE in accordance with another example of the present disclosure.

FIG. 5 illustrates a method of a network entity in accordance with another example of the present disclosure.

FIG. 6 illustrates a method of a UE in accordance with another example of the present disclosure.

MODE FOR THE INVENTION

Figure 1:
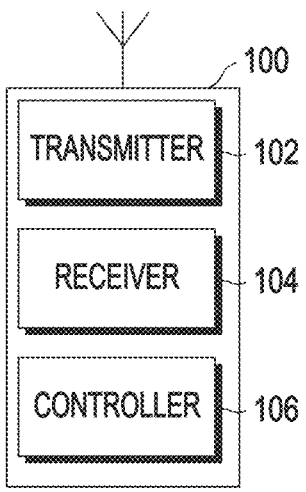
FIG. 1 illustrates an example structure of a network entity in accordance with an example of the present disclosure.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Herein, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Herein, the singular form, for example "a", "an" and "the", encompasses the plural unless the context otherwise requires. For example, reference to "an object" includes reference to one or more of such objects.

Herein, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/ or groups thereof described or disclosed in conjunction with a particular aspect, embodiment, example or claim of the present disclosure are to be understood to be applicable to any other aspect, embodiment, example or claim described herein unless incompatible therewith.

Certain examples of the present disclosure provide methods, apparatus and systems for performing authentication and authorization in a network. The following examples are applicable to, and use terminology associated with, 3GPP 5G. For example, certain examples of the present disclosure provide methods, apparatus and systems for performing NSSAA in 3GPP 5G. However, the skilled person will appreciate that the techniques disclosed herein are not limited to these examples or to 3GPP 5G, and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of an AMF in the examples below may be applied to any other suitable type of entity performing access and mobility management functions, and the functionality of an SMF in the examples below may be applied to any other suitable type of entity performing session management functions.

The skilled person will appreciate that the present invention is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Certain examples of the present disclosure may be provided in the form of a system (e.g. a network) comprising one or more such apparatuses/devices/network entities, and/or a method therefor. For example, in the following examples, a network may include a UE, AMF and an SMF.

At least the following problems exist in view of the related art:

1. Problem: Registration to Slices when NSSAA is Ongoing
   The following scenario can occur:
   Step 1: the UE may send a requested NSSAI in a Registration Request message;
   For simplicity, assume this requested NSSAI contains entries {A,B}.
   Step 2: the UE receives a pending NSSAI in the Registration Accept message;
   For simplicity, assume this pending NSSAI contains {B}, reflecting that NSSAA needs to be performed for slice B.
   Step 3: the UE may also receive an allowed NSSAI in the Registration Accept message;
   For simplicity, assume this contains {A}.
   Step 4: the UE needs to register to additional slices i.e. the UE needs to use more slices in addition to what was requested in step 1;
   For simplicity, assume the UE needs to now use {A, B, C}.
   If the pending NSSAI contains at least one S-NSSAI that was requested by the UE (in the requested NSSAI) in step 1, then according to a requirement that was previously stated, the UE will not be able to send a requested NSSAI containing the entry {B} because S-NSSAI B is in the pending NSSAI list.
   With this, if the UE then sends a requested NSSAI {A, C}, then the AMF sees a new requested NSSAI {A, C} and will consider the last requested NSSAI (i.e., {A, B}) to be invalid. The AMF then concludes that the UE now wants to use slices {A, C} only and that the UE does not want to use slice {B} anymore. This may lead to the AMF removing the S-NSSAI for slice B from the pending NSSAI.
   With the example above, it can be seen that the given requirement that the requested NSSAI cannot contain any S-NSSAI that is in the pending NSSAI will lead to cases in which the UE cannot inform the AMF about the actual slices that the UE needs to use. Moreover, the AMF will make a wrong determination about the slices that the UE actually wants to use.

2. Problem: NSSAA for Slices that are not Available in the UE's Registration Area
   As indicated earlier, a slice should at least be available for a UE to use in the UE's registration area (RA). If available, and if the slice is subject to NSSAA, then the network will run NSSAA for the S-NSSAI in question.
   As discussed above, the current specification does not require checking the availability of the slice in the UE's RA before checking for the need to run NSSAA. In other words, the AMF immediately checks if an S-NSSAI in the requested NSSAI is subject to NSSAA and if yes the AMF will run NSSAA. If this happens, then there can be a situation where signalling is unnecessarily used to execute NSSAA for an S-NSSAI that is in fact not even available for the UE in the first place. This may result in unnecessary use of computational resources also.
   If the network is configured such that the availability of the slice in the UE's RA is not verified first, then the AMF will have to perform this verification after NSSAA is performed. Afterwards the AMF can either allow or indicate that the slice is not allowed for the PLMN and registration area combination. This component is also missing in the current specification.

To further clarify the problem, the following text can be used from [3] (see: 5.5.1.2.4; 5.5.1.3.4):

"If the UE indicated the support for network slice-specific authentication and authorization, and if the Requested NSSAI IE includes one or more S-NSSAIs subject to network slice-specific authentication and authorization, the AMF shall in the REGISTRATION ACCEPT message include:

a) the allowed NSSAI containing the S-NSSAI(s) or the mapped 5-NSSAI(s), if any:
        1) which are not subject to network slice-specific authentication and authorization and are allowed by the AMF; or
        2) for which the network slice-specific authentication and authorization has been successfully performed;
    b) optionally, the rejected NSSAI for the failed or revoked NSSAA;
    c) pending NSSAI containing one or more S-NSSAIs for which network slice-specific authentication and authorization will be performed or is ongoing, if any; and
    d) the "NSSAA to be performed" indicator in the 5GS registration result IE set to indicate whether network slice-specific authentication and authorization procedure will be performed by the network, if the allowed NSSAI is not included in the REGISTRATION ACCEPT message."

From bullet a1), it can be seen that the AMF verifies if the S-NSSAIs "are allowed by the AMF". Here it should be noted that the AMF does consider the UE's RA since the concept of allowed NSSAI is per the UE's RA (i.e. the entries of the allowed NSSAI are valid in the current RA only).

However, from bullet c) it can be seen that the AMF only verifies if NSSAA is required. As such, it is possible that NSSAA is always required for the S-NSSAI but this does not mean that the S-NSSAI is allowed to be used in the current RA even if NSSAA succeeds for this slice. Hence, the AMF behaviour needs to be updated to consider such a case in which an S-NSSAI requires NSSAA but the S-NSSAI is not allowed in the current RA.

1. Solution to Allow Registration to Slices when NSSAA is Ongoing

As described above a problem may arise when the UE needs to register to additional slices, i.e., in addition to a slice for which there is pending NSSAA.

1a. Use of a New Information Element (IE) to Register to Additional Slices

A first solution disclosed herein is to use a new IE to solve the problem. A new IE can be defined for the purpose of indicating that the UE wants to register or use at least one S-NSSAI in addition to what the S-NSSAI(s) that the UE had initially requested and which are also in the pending NSSAI.

The new IE can be given any name; however, for the purpose of this explanation, this IE will be called Additional requested NSSAI IE (or in short, additional requested NSSAI).

Two options for this first solution are now disclosed, although it will be appreciated that embodiments of the present disclosure are not limited to these:

Option 1

When the UE needs to register to a set of slices where any of these slices has a corresponding S-NSSAI that is in the pending NSSAI in the UE, the UE shall send the Registration Request and include the Additional requested NSSAI IE (additional requested NSSAI). The UE shall set the contents of the Additional requested NSSAI IE to include the set of S-NSSAIs that the UE needs to register to (or use) in addition to the set of S-NSSAIs that is in the pending NSSAI. However, the additional requested NSSAI does not include any S-NSSAI from the pending NSSAI.

Note that the UE can send the additional requested NSSAI on a different access from which it had previously sent a requested NSSAI that led to the inclusion of at least one S-NSSAI into the pending NSSAI. By doing so i.e. by sending the requested additional NSSAI over a different access technology (or access type), the UE indicates that it wants to use the S-NSSAIs in the requested additional NSSAI in addition to the S-NSSAIs in the pending NSSAI (and optionally in addition to the S-NSSAIs in the allowed NSSAI, if any). Hence, the use of the requested additional NSSAI applies to any access technology (or access type) as described herein. Moreover, the same behaviour of the UE as described herein may apply regardless of the access technology that is used by the UE to send the additional requested NSSAI. In various embodiment, the access technology is referred to access type.

The contents of the additional requested NSSAI can also be considered to be the set of S-NSSAIs that are being requested in addition to any S-NSSAI that is in the allowed NSSAI if the UE has one (or if the AMF has one for the UE). As such, the purpose of the additional requested NSSAI is to indicate the slices that the UE wants to use in addition to the S-NSSAIs in the pending NSSAI and also in addition to the S-NSSAIs that the UE has received in the allowed NSSAI, if any. Hence, in this option, the additional requested NSSAI will not contain the entries of the allowed NSSAI.

When the AMF receives the additional requested NSSAI, the AMF should ensure that the total number of S-NSSAI entries in the pending NSSAI (due to a request from the current access technology), in the allowed NSSAI if any, and in the additional requested NSSAI, does not exceed a certain maximum number e.g. 8, for the current access technology. If it does exceed 8, the AMF should ignore the last M entries in the additional requested NSSAI, where M is an integer, such that the maximum number of S-NSSAIs that the UE requests to use would not exceed a certain maximum number e.g. 8.

When the AMF receives the Additional requested NSSAI IE (or additional requested NSSAI) and (optionally) if there is a pending NSSAI for the UE, the AMF considers the S-NSSAIs in the additional requested NSSAI as the new additional slices that the UE additionally wants to use or register to (i.e. in addition to the S-NSSAI entries in the pending NSSAI, and (optionally) in the allowed NSSAI, if any). The AMF should then verify if any S-NSSAI in the additional requested NSSAI is allowed for the UE (i.e. not subject to NSSA or for which NSSAA is not required or has been successfully performed) and also verifies if there is any S-NSSAI is subject to NSSAA and requires NSSAA.

Note that the AMF takes the actions described herein even if the additional requested NSSAI is received over a different access technology from the one that was previously used to request a set of slices for which at least one of the S-NSSAIs that was requested was placed in the pending NSSAI. Hence, the AMF takes the same behaviour as described herein regardless of the access technology over which the additional requested NSSAI is received. Therefore, receipt of the requested additional NSSAI means that the UE wants to use the S-NSSAIs in the additional requested NSSAI and the S-NSSAIs in the pending NSSAI (and optionally the S-NSSAIs in the allowed NSSAI, if any) on the access technology over which the requested NSSAI was received by the AMF. This also means that when NSSAA is successful, the AMF should send the allowed NSSAI over each and every access technology that the AMF has determined that the UE wants to use the corresponding S-NSSAIs based on the access technology over which the additional requested NSSAI is received (as described above). For example, the AMF can send the allowed NSSAI to the UE using the Configuration Update Command message which should be sent over each access technology after the determination by the AMF as explained above.

If at least one of S-NSSAI in the additional requested NSSAI is subject to NSSAA, the AMF should update the list of pending NSSAI (or the S-NSSAIs for which NSSAA is required) such that this S-NSSAI (from the additional requested NSSAI) is now also subject to NSSAA. The AMF should then perform NSSAA for this S-NSSAI. The AMF should also update the UE with a new list of pending NSSAI such that the pending NSSAI now contains any S-NSSAI, from the additional requested NSSAI, that requires NSSAA. The AMF should send the new list of pending NSSAI to the UE in the Registration Accept message.

If at least one S-NSSAI in the additional requested NSSAI is allowed for the UE, the AMF may also include an allowed NSSAI in the Registration Accept message, where the allowed NSSAI:

Contains all the S-NSSAIs that are allowed for the UE, including all the S-NSSAIs that were previously allowed for the UE if any. Note that the allowed NSSAI can contain S-NSSAIs from the additional requested NSSAI if any S-NSSAI does not require NSSAA (or for which NSSAA has been previously successfully performed) and is allowed for the UE (optionally, in the current registration area)

Contains any S-NSSAI for which NSSAA has been successfully completed (optionally, from a previous requested NSSAI). Note that the AMF may also remove such S-NSSAI from the pending NSSAI that is optionally sent to the UE in the Registration Accept message If at least one S-NSSAI in the additional requested NSSAI is not allowed for the UE, or is not available in the current registration area, the AMF should send the rejected NSSAI containing any such S-NSSAI and a corresponding cause value to indicate the reason for rejection.

In certain examples, the AMF can use a new Additional allowed NSSAI IE (or additional allowed NSSAI) to include any S-NSSAI from the additional requested NSSAI that are allowed for the UE. The AMF can send this IE to the UE in the Registration Accept message.

In certain examples, the AMF can use a new Additional pending NSSAI IE (or additional pending NSSAI) to include any S-NSSAI from the additional requested NSSAI that is subject to NSSAA (or for which NSSAA will be performed). The AMF can send this IE to the UE in the Registration Accept message.

In certain examples, the Additional allowed NSSAI IE and/or Additional pending NSSAI IE can also be sent to the UE in the Configuration Update Command (CUC) message.

If the UE receives the Additional allowed NSSAI IE in the Registration Accept message (or CUC message), the UE should add the entries of this IE to the list of allowed NSSAI. The UE should also remove any S-NSSAI from the rejected NSSAI or (additional) pending NSSAI that matches an S-NSSAI from the additional allowed NSSAI.

If the UE receives the Additional pending NSSAI IE in the Registration Accept message (or CUC message), the UE should add the entries of this IE to the list of pending NSSAI. The UE should also remove any S-NSSAI from the rejected NSSAI or (additional) allowed NSSAI that matches an S-NSSAI from the additional pending NSSAI.

In certain examples, when the UE sends the additional requested NSSAI, the UE may not send the requested NSSAI in the same NAS message.

In certain examples, when the AMF sends the additional allowed NSSAI, the AMF may not send the allowed NSSAI in the same NAS message.

In certain examples, when the AMF sends the additional pending NSSAI, the AMF may not send the pending NSSAI in the same NAS message.

Option 2:

In contrast to Option 1, here the additional requested NSSAI should also include any S-NSSAI that is in the allowed NSSAI, if any. Hence, when the UE needs to register to (or use) slices in addition to what has been requested previously, the UE should send the Registration Request message including the additional requested NSSAI where the latter contains the additional (new) S-NSSAIs that the UE wants to register to (or use) and the S-NSSAI that are included in the allowed NSSAI.

When the AMF receives the additional requested NSSAI, the AMF should ensure that the total number of S-NSSAI entries in the pending NSSAI (due to a request from the current access technology) and in the additional requested NSSAI does not exceed a certain maximum number e.g. 8, for the current access technology. If it does exceed 8, the AMF should ignore the last M entries in the additional requested NSSAI, where M is an integer, such that the maximum number of S-NSSAIs that the UE requests to use would not exceed a certain maximum number e.g. 8.

Note that the UE can send the additional requested NSSAI on a different access from which it had previously sent a requested NSSAI that led to the inclusion of at least one S-NSSAI into the pending NSSAI. By doing so i.e. by sending the requested additional NSSAI over a different access technology, the UE indicates that it wants to use the S-NSSAIs in the requested additional NSSAI in addition to the S-NSSAIs in the pending NSSAI. Hence, the use of the requested additional NSSAI applies to any access technology as described herein. Moreover, the same behaviour of the UE as described herein may apply regardless of the access technology that is used by the UE to send the additional requested NSSAI.

When the AMF receives the additional requested NSSAI and (optionally) if there is a pending NSSAI for the UE, the AMF verifies if there is any S-NSSAI that is allowed for the UE (i.e. not subject to NSSA or for which NSSAA is not required or has been successfully performed) and also verifies if there is any S-NSSAI is subject to NSSAA and requires NSSAA.

Note that the AMF takes the actions described herein even if the additional requested NSSAI is received over a different access technology from the one that was previously used to request a set of slices for which at least one of the S-NSSAIs that was requested was placed in the pending NSSAI. Hence, the AMF takes the same behaviour as described herein regardless of the access technology over which the additional requested NSSAI is received. Therefore, receipt of the requested additional NSSAI means that the UE wants to use the S-NSSAIs in the additional requested NSSAI and the S-NSSAIs in the pending NSSAI on the access technology over which the requested NSSAI was received by the AMF. This also means that when NSSAA is successful, the AMF should send the allowed NSSAI over each and every access technology that the AMF has determined that the UE wants to use the corresponding S-NSSAIs based on the access technology over which the additional requested NSSAI is received (as described above). For example, the AMF can send the allowed NSSAI to the UE using the Configuration Update Command message which should be sent over each access technology after the determination by the AMF as explained above.

If at least one S-NSSAI from the additional requested NSSAI is subject to NSSAA, the AMF should update the list of pending NSSAI (or the S-NSSAIs for which NSSAA is required) such that this S-NSSAI (from the additional requested NSSAI) is now also subject to NSSAA. The AMF should then perform NSSAA for this S-NSSAI. The AMF should also update the UE with a new list of pending NSSAI such that the pending NSSAI now contains any S-NSSAI, from the additional requested NSSAI, that requires NSSAA. The AMF should send the new list of pending NSSAI to the UE in the Registration Accept message.

If at least one S-NSSAI in the additional requested NSSAI is allowed for the UE, the AMF may also include an allowed NSSAI in the Registration Accept message, where the allowed NSSAI:

Contains all the S-NSSAIs that are allowed for the UE, including all the S-NSSAIs that were previously allowed for the UE if any. Note that the allowed NSSAI can contain S-NSSAIs from the additional requested NSSAI if any S-NSSAI does not require NSSAA (or for which NSSAA has been previously successfully performed) and is allowed for the UE (optionally, in the current registration area)

Contains any S-NSSAI for which NSSAA has been successfully completed. Note that the AMF may also remove such S-NSSAI from the pending NSSAI that is optionally sent to the UE in the Registration Accept message If at least one S-NSSAI in the additional requested NSSAI is not allowed for the UE, or is not available in the current registration area, the AMF should send the rejected NSSAI containing any such S-NSSAI and a corresponding cause value to indicate the reason for rejection.

In certain examples, the AMF can use a new Additional allowed NSSAI IE (or additional allowed NSSAI) to include any S-NSSAI from the additional requested NSSAI that are allowed for the UE. The AMF can send this IE to the UE in the Registration Accept message.

In certain examples, the AMF can use a new Additional pending NSSAI IE (or additional pending NSSAI) to include any S-NSSAI from the additional requested NSSAI that is subject to NSSAA (or for which NSSAA will be performed). The AMF can send this IE to the UE in the Registration Accept message.

In certain examples, the Additional allowed NSSAI IE and/or Additional pending NSSAI IE can also be sent to the UE in the Configuration Update Command (CUC) message.

If the UE receives the Additional allowed NSSAI IE in the Registration Accept message (or CUC message), the UE should add the entries of this IE to the list of allowed NSSAI. The UE should also remove any S-NSSAI from the rejected NSSAI or (additional) pending NSSAI that matches an S-NSSAI from the additional allowed NSSAI.

If the UE receives the Additional pending NSSAI IE in the Registration Accept message (or CUC message), the UE should add the entries of this IE to the list of pending NSSAI. The UE should also remove any S-NSSAI from the rejected NSSAI or (additional) allowed NSSAI that matches an S-NSSAI from the additional pending NSSAI.

In certain examples, when the UE sends the additional requested NSSAI, the UE may not send the requested NSSAI in the same NAS message.

In certain examples, when the AMF sends the additional allowed NSSAI, the AMF may not send the allowed NSSAI in the same NAS message.

In certain examples, when the AMF sends the additional pending NSSAI, the AMF may not send the pending NSSAI in the same NAS message.

1b. Use the Requested NSSAI IE to Register to Additional Slices

A second solution disclosed herein is to use the existing Requested NSSAI IE (or requested NSSAI) to solve the problem. Here, the requested NSSAI should be used by the UE to register to slices that are in addition to the S-NSSAI entries which are included in the pending NSSAI.

Four options for this second solution are now disclosed, although it will be appreciated that embodiments of the present disclosure are not limited to these:

Option 1

When the UE needs to register to a set of slices where any of these slices has a corresponding S-NSSAI that is in the pending NSSAI in the UE, the UE shall send the Registration Request and include the Requested NSSAI IE. The UE shall set the contents of the Requested NSSAI IE to contain the set of S-NSSAIs that the UE needs to register to (or use) in addition to the set of S-NSSAIs that is in the pending NSSAI. However, the requested NSSAI does not include any S-NSSAI from the pending NSSAI.

The contents of the requested NSSAI can also be considered to be the set of S-NSSAIs that are being requested in addition to any S-NSSAI that is in the allowed NSSAI if the UE has one (or if the AMF has one for the UE). As such, the purpose of the requested NSSAI is to indicate the slices that the UE wants to use in addition to the S-NSSAIs in the pending NSSAI and also in addition to the S-NSSAIs that the UE has received in the allowed NSSAI, if any. Hence, in this option, the requested NSSAI will not contain the entries of the allowed NSSAI.

In certain examples, the UE can use a new bit in the 5GS update type IE to indicate if the contents of the requested NSSAI are new or sent in addition to what was already requested by the UE in the pending NSSAI and optionally in addition to any S-NSSAI in the allowed NSSAI. The new bit can be called, as an example, "Additional slice(s) indication", where e.g. if the bit is set to '1' the bit means "Additional slice(s) requested", or if the bit is set to '0' then it means "Additional slice(s) not requested". Hence, if the UE is requesting additional slices to those in the pending NSSAI, and optionally to those in the allowed NSSAI, the UE sends the requested NSSAI and sets the new bit accordingly e.g. to '1'. On the other hand, if the UE is registering to a completely new slices (i.e. slices that are different from what is in the pending NSSAI, and allowed NSSAI if available), the UE sends the requested NSSAI and sets the value of this bit accordingly e.g. to '0'.

Note that the usage of the bit as proposed above can be to inform the AMF that the UE wants to also use all the S-NSSAI entries in the pending NSSAI over the access technology over which the UE sends the Registration Request with the bit set to ' F. Hence, the setting of the bit to e.g.' l' as described above should mean that the UE also wants to use the S-NSSAI entries in the pending NSSAI over the access technology use for sending the NAS message with the bit set to '1'. This however does not mean that the UE must also send the requested NSSAI.

For example, if the UE only wants to register to or use the slices which are in the pending NSSAI (e.g. from another/ previous registration procedure over another access technology) over the current access technology, the UE should set the bit to indicate so e.g. to '1'. If in addition the UE also needs to register to or use other slices, in addition to what is in the pending NSSAI, the UE should also then include the requested NSSAI which should then contain the additional S-NSSAIs that the UE wants to register to or use. It should be noted that such a solution may be used with any bit as proposed herein where the bit may have a different name instead of "Additional slice(s) indication". For example, this bit can be called "Request to use slices of the pending NSSAI", or any other name can be used. Hence, the name of the bit, and/or the value used to mean a specific indication only but rather as an example. Note that this bit may be used for the indicated reason (i.e. to indicate desire to use the slices in the pending NSSAI, or to request to use the slices in the pending NSSAI) on the same access technology over which the S-NSSAIs that are in the pending NSSAI were previously sent, or over another access technology as described above.

Note that the examples of the bits provided above may mean that these two bits are both present and used as described above, or may mean that one of these bits is used as described above.

When the AMF receives the Requested NSSAI IE (or requested NSSAI) and (optionally) if there is a pending NSSAI for the UE, the AMF considers the S-NSSAIs in the requested NSSAI as the new additional slices that the UE additionally wants to use or register to.

In certain examples, the AMF determines if the contents of the requested NSSAI are in addition to what the UE had already requested in the pending NSSAI, and, in further examples, what was requested in the allowed NSSAI, based on the value of the new bit in the 5GS update type IE.

If the bit is set to '1', for example, the AMF considers that the requested NSSAI contents are being requested in addition to the entries in the pending NSSAI, and optionally in addition to the entries in the current allowed NSSAI if one is available for the UE.

If the AMF receives a new indication e.g. a new bit in the 5GS update type IE (for example, where this bit is set to '1' to indicate that the UE wants to use additional slices or to indicate that the UE wants to use the slices in the pending NSSAI) but does not receive the requested NSSAI (or does not receive any other IE with a set of slices that are requested), the AMF should consider that the UE also wants to use the S-NSSAIs in the pending NSSAI on the access technology over which the bit was received (or the indication was received) even though the NAS message did not contain a requested NSSAI. Hence, the reception of the new bit at the AMF may mean (and hence the AMF may determine) that the UE wants to also use the S-NSSAIs in the pending NSSAI on the access technology over which the indication is received. Additionally, if the requested NSSAI is also received by the AMF, then the AMF also considers its S-NSSAI contents to be the additional slices that the UE wants to register to or use, in addition to those in the pending NSSAI and that the UE wants to use these slices on the access technology over which the bit is received and optionally over which the requested NSSAI may also have been received.

Otherwise, if the bit is set to '0', for example, the AMF determines that the contents of the requested NSSAI are being requested as completely new slices and hence the UE no longer wants to use the entries in the pending NSSAI that were requested over the current access, and optionally the UE no longer wants to use the entries in the allowed NSSAI if one is available for the UE. The AMF then processes the contents of the requested NSSAI as indicated below.

If the bit is set to '0', then the AMF may optionally process the contents of the requested NSSAI as proposed herein.

The use of the new bit by the UE as described above, and the handling of the new bit by the AMF, and optionally the handling of the requested NSSAI accordingly, can apply to other solutions options in this disclosure and hence this proposal for the UE and AMF, based on the new bit in the 5GS update type IE, is not specific to this solution option only.

According to certain examples, the new bit can be sent in any other IE and in any other NAS message and hence the proposal is not limited to the 5GS update type IE only and also not specific to the Registration Request message only.

The AMF should then verify if any S-NSSAI in the requested NSSAI is allowed for the UE (i.e. not subject to NSSA or for which NSSAA is not required or has been successfully performed) and also verifies if there is any S-NSSAI is subject to NSSAA and requires NSSAA.

If at least one of S-NSSAI in the requested NSSAI is subject to NSSAA, the AMF should update the list of pending NSSAI (or the S-NSSAIs for which NSSAA is required) such that this S-NSSAI (from the requested NSSAI) is now also subject to NSSAA. The AMF should then perform NSSAA for this S-NSSAI. The AMF should also update the UE with a new list of pending NSSAI such that the pending NSSAI now contains any S-NSSAI, from the requested NSSAI, that requires NSSAA. The AMF should send the new list of pending NSSAI to the UE in the Registration Accept message.

If at least one S-NSSAI in the requested NSSAI is allowed for the UE, the AMF may also include an allowed NSSAI in the Registration Accept message, where the allowed NSSAI:

Contains all the S-NSSAIs that are allowed for the UE, including all the S-NSSAIs that were previously allowed for the UE if any. Note that the allowed NSSAI can contain S-NSSAIs from the requested NSSAI if any S-NSSAI does not require NSSAA (or for which NSSAA has been previously successfully performed) and is allowed for the UE (optionally in the current registration area)

Contains any S-NSSAI for which NSSAA has been successfully completed. Note that the AMF may also remove such S-NSSAI from the pending NSSAI that is optionally sent to the UE in the Registration Accept message In certain examples, the AMF can use a new Additional allowed NSSAI IE (or additional allowed NSSAI) to include any S-NSSAI from the requested NSSAI that are allowed for the UE. The AMF can send this IE to the UE in the Registration Accept message.

In certain examples, the AMF can use a new Additional pending NSSAI IE (or additional pending NSSAI) to include any S-NSSAI from the requested NSSAI that is subject to NSSAA (or for which NSSAA will be performed). The AMF can send this IE to the UE in the Registration Accept message.

In certain examples, the Additional allowed NSSAI IE and/or Additional pending NSSAI IE can also be sent to the UE in the Configuration Update Command (CUC) message.

If the UE receives the Additional allowed NSSAI IE in the Registration Accept message (or CUC message), the UE should add the entries of this IE to the list of allowed NSSAI. The UE should also remove any S-NSSAI from the rejected NSSAI or (additional) pending NSSAI that matches an S-NSSAI from the additional allowed NSSAI.

If the UE receives the Additional pending NSSAI IE in the Registration Accept message (or CUC message), the UE should add the entries of this IE to the list of pending NSSAI. The UE should also remove any S-NSSAI from the rejected NSSAI or (additional) allowed NSSAI that matches an S-NSSAI from the additional pending NSSAI.

Option 2

In contrast to Option 1, here the requested NSSAI should also include any S-NSSAI that is in the allowed NSSAI, if any. Hence, when the UE needs to register to (or use) slices in addition to what has been requested previously, the UE should send the Registration Request message including the requested NSSAI where the latter contains the additional (new) S-NSSAIs that the UE wants to register to (or use) and the S-NSSAI that are included in the allowed NSSAI.

When the AMF receives the requested NSSAI and (optionally) if there is a pending NSSAI for the UE, the AMF verifies if there is any S-NSSAI that is allowed for the UE (i.e. not subject to NSSA or for which NSSAA is not required or has been successfully performed) and also verifies if there is any S-NSSAI is subject to NSSAA and requires NSSAA.

If at least one S-NSSAI from the requested NSSAI is subject to NSSAA, the AMF should update the list of pending NSSAI (or the S-NSSAIs for which NSSAA is required) such that this S-NSSAI (from the requested NSSAI) is now also subject to NSSAA. The AMF should then perform NSSAA for this S-NSSAI. The AMF should also update the UE with a new list of pending NSSAI such that the pending NSSAI now contains any S-NSSAI, from the requested NSSAI, that requires NSSAA. The AMF should send the new list of pending NSSAI to the UE in the Registration Accept message.

If at least one S-NSSAI in the requested NSSAI is allowed for the UE, the AMF may also include an allowed NSSAI in the Registration Accept message, where the allowed NSSAI:

Contains all the S-NSSAIs that are allowed for the UE, including all the S-NSSAIs that were previously allowed for the UE if any. Note that the allowed NSSAI can contain S-NSSAIs from the requested NSSAI if any S-NSSAI does not require NSSAA (or for which NSSAA has been previously successfully performed) and is allowed for the UE (optionally in the current registration area)

Contains any S-NSSAI for which NSSAA has been successfully completed. Note that the AMF may also remove such S-NSSAI from the pending NSSAI that is optionally sent to the UE in the Registration Accept message In certain examples, the AMF can use a new Additional allowed NSSAI IE (or additional allowed NSSAI) to include any S-NSSAI from the requested NSSAI that are allowed for the UE. The AMF can send this IE to the UE in the Registration Accept message.

In certain examples, the AMF can use a new Additional pending NSSAI IE (or additional pending NSSAI) to include any S-NSSAI from the requested NSSAI that is subject to NSSAA (or for which NSSAA will be performed). The AMF can send this IE to the UE in the Registration Accept message.

In certain examples, the Additional allowed NSSAI IE and/or Additional pending NSSAI IE can also be sent to the UE in the Configuration Update Command (CUC) message.

If the UE receives the Additional allowed NSSAI IE in the Registration Accept message (or CUC message), the UE should add the entries of this IE to the list of allowed NSSAI. The UE should also remove any S-NSSAI from the rejected NSSAI or (additional) pending NSSAI that matches an S-NSSAI from the additional allowed NSSAI.

If the UE receives the Additional pending NSSAI IE in the Registration Accept message (or CUC message), the UE should add the entries of this IE to the list of pending NSSAI. The UE should also remove any S-NSSAI from the rejected NSSAI or (additional) allowed NSSAI that matches an S-NSSAI from the additional pending NSSAI.

Option 3

Here, the UE is not allowed to register to any S-NSSAI that is in the pending NSSAI when such a list is available at the UE and/or at the AMF. Therefore, the only time the UE is allowed to send the requested NSSAI is when the UE requires to register to, or use, a set of S-NSSAIs for which there is no matching S-NSSAI entry in the pending NSSAI. Moreover, this means that all the S-NSSAI entries in the pending NSSAI that were previously requested over the same access as the access that is used to send the new requested NSSAI are considered to be not required for use by the UE. In some examples, a 'matching entry' takes into account an access technology over which registration to the corresponding slice is requested.

In this case, when the AMF receives the requested NSSAI, the AMF considers that the UE is requesting a completely new set of S-NSSAI for which there is no matching S-NSSAI in the pending NSSAI. Therefore, when the AMF receives the requested NSSAI, and (optionally) when the AMF has a pending NSSAI for the UE, the AMF shall consider the new received requested NSSAI as valid and consider any previous allowed NSSAI for the current access as invalid.

The AMF should verify the contents of the requested NSSAI and compare them with those in the pending NSSAI.

For any S-NSSAI that is in the requested NSSAI that is received over this access technology, if the S-NSSAI was not requested over another access technology, the AMF should remove from the pending NSSAI any S-NSSAI that matches an entry from the requested NSSAI. This is because the UE may have requested another set of S-NSSAI over a different access technology that is also subject to NSSAA and hence that is in the pending NSSAI. The AMF should stop any ongoing NSSAA for any S-NSSAI that was requested over this access technology (i.e. over which the requested NSSAI is received).

For any S-NSSAI that is in the requested NSSAI that is received over this access technology, if the S-NSSAI was previously requested over another access technology, the AMF should not remove the S-NSSAI entry from the pending NSSAI if it is present. The AMF should then verify if the new requested NSSAI is subject to NSSAA or not as per existing procedures.

If the UE is not registered over another access technology, then the AMF can immediately consider the contents of the pending NSSAI as invalid or remove all S-NSSAIs from the pending NSSAI when the requested NSSAI is received.

The AMF should then verify if the new requested NSSAI is subject to NSSAA or not as per existing procedures. If yes, the AMF should include any S-NSSAI that is subject to NSSAA in the pending NSSAI and send the updated pending NSSAI to the UE, and the AMF should perform NSSAA for the S-NSSAI that is subject to NSSAA. Otherwise, if the S-NSSAI is allowed and available for the UE in the current RA, the AMF should include the S-NSSAI in the allowed NSSAI and send it to the UE. Note that the new requested NSSAI may not be subject to NSSAA and so the AMF may have removed some entries from the pending NSSAI as explained above. In this case, even if the AMF did not include any S-NSSAI entry, the AMF should send the updated pending NSSAI after removing any S-NSSAI entry and send it to the UE.

The above may be explained by reference to the following illustrative examples:

Example 1

The UE sent a requested NSSAI={A, B} over a first access.

The UE sent a requested NSSAI={C, D} over a second access.

The AMF has a pending NSSAI={A, B, C, D} for the UE.

The UE sends a requested NSSAI={E, F} over the first access;

The AMF should remove {A, B} from the pending NSSAI;

The AMF should verify if {E, F} are subject to NSSAA:

If not, the AMF should send the pending NSSAI={C, D} to the UE;

If yes, the AMF should send the pending NSSAI={C, D, E, F} to the UE.

Option 4

Here, the UE is configured in a manner that indicates whether the requested NSSAI can contain an S-NSSAI entry from the pending NSSAI.

The UE may be pre-configured with this information in the USIM or the ME. Alternatively, the network may indicate to the UE using a new bit that can be defined as part of the 5GS registration result IE or the 5GS network feature support IE.

For example, a new bit can be defined, e.g. "Registration to an S-NSSAI from the pending NSSAI" (RSPN) bit (noting that this name is just as an example and the bit can be called differently). For example, if the bit is set to a value '1', then this may mean "Registration to an S-NSSAI from the pending NSSAI allowed", or when it is set to '0' then this may mean "Registration to an S-NSSAI from the pending NSSAI not allowed". The AMF may set this bit to the corresponding value based on operator policy or UE subscription.

If configured to request, or register to, an S-NSSAI from the pending NSSAI, either with pre-configuration or using an indication from the network as described above, the UE may then include any S-NSSAI in the requested NSSAI even if this S-NSSAI is in the pending NSSAI.

If not configured to request, or register to, an S-NSSAI from the pending NSSAI, the UE may operate using any of the solution options proposed above. For example, whenever the UE sends the requested NSSAI, it means that the UE is requesting slices that are in addition to the pending NSSAI as in Option 2 (for Solution 1b) discussed above. However, other solutions options can also be used in this case.

1c. Wait Until Pending NSSAI is Empty

As another solution to the problem identified above, the UE may be configured to wait until the pending NSSAI is empty before transmitting a request to use at least one other S-NSSAI in addition to at least one S-NSSAI that is in the pending NSSAI.

For example, the UE may wait for NSSAA to terminate or finish before registering to a new slice, or may wait to ensure that that slices that the UE wants to use (e.g. over an access technology) have no corresponding S-NSSAI entry in the pending NSSAI (even though the pending NSSAI may not be empty). For example, assume that the UE has requested to use slices {A, B} over the 3GPP access. Assume also that the pending NSSAI contains {A, B}. If during NSSAA, or while the pending NSSAI is not empty, the UE now wants to use slices {A, B, C}, then the UE should wait until no S-NSSAI entry (i.e. from {A, B, C} in this example) in the set of slices that the UE wants to use is present in the pending NSSAI. As such, when the pending NSSAI is empty or is modified such that an S-NSSAI entry that is required by the UE is not present in it, the UE may then request to use the corresponding S-NSSAI by including it in the requested NSSAI and sending the latter in the Registration Request.

Optionally, the UE may be configured to wait for a specific pre-configured (e.g. in the USIM or in the non-volatile memory or in a management object file) or known time T during which the UE cannot request any S-NSSAI that is in the pending NSSAI. As such, the UE may start a timer with a length of T units (e.g. seconds, minutes, hours, etc) whenever a pending NSSAI is received or whenever the contents of the pending NSSAI are modified. During this time T, the UE is not allowed to request an S-NSSAI that is in the pending NSSAI. Upon expiry of the timer, the UE may then be allowed to request an S-NSSAI even if it is in still in the pending NSSAI. Alternatively, the UE may be provided with the value of the timer T in any NAS message such as the Registration Accept message or the Configuration Update Command message. The AMF may provide the length of the timer T in the NAS messages listed above and the AMF can do so at any time or whenever its policies require it to do so or whenever the AMF determines to change the duration of this timer.

2. Solution for Handling of an S-NSSAI that is Subject to NSSAA but that is not Allowed in the UE's Current Registration Area As described above a problem may arise when there is an S-NSSAI subject to NSSAA but not available or not allowed in the RA of the UE. Two solutions for handling the case of an S-NSSAI being subject to NSSAA but is not available in the current UE's registration area (RA) are now disclosed:

2a. The AMF does not Perform NSSAA for Slices that are not Available in the UE's RA Here, the AMF should verify if an S-NSSAI (optionally: if the S-NSSAI is in the requested NSSAI (or in the requested mapped NSSAI, or in the additional requested NSSAI) and if the latter was sent by the UE, or an S-NSSAI that is marked as default in the UE's subscription if the UE did not send a requested NSSAI (or did not send the requested mapped NSSAI, or did not send the additional requested NSSAI) or the entries of the requested NSSAI (or in the requested mapped NSSAI, or in the additional requested NSSAI) are not available/allowed for the UE) is available/allowed for the UE in the UE's RA. In certain examples, this condition should be verified before or regardless of whether NSSAA is required for this S-NSSAI or not.

If the AMF determines that an S-NSSAI is not available/allowed for the UE in this RA, the AMF should not initiate NSSAA for the S-NSSAI. The AMF should include the S-NSSAI in the rejected NSSAI and set the cause value accordingly to indicate the reason why an S-NSSAI is rejected. For example, the cause value can be set to "S-NS-SAI not available in the current registration area".

This solution is optionally applicable on a per access basis since an S-NSSAI may be available for the UE in the current RA over one access technology but not the other.

2b. The AMF does Perform NSSAA for Slices that are not Available in the UE's RA

Here, the AMF may verify if an S-NSSAI (optionally: if the S-NSSAI is in the requested NSSAI (or in the requested mapped NSSAI, or in the additional requested NSSAI) and if the latter was sent by the UE, or an S-NSSAI that is marked as default in the UE's subscription if the UE did not send a requested NSSAI (or did not send the requested mapped NSSAI, or did not send the additional requested NSSAI) or the entries of the requested NSSAI (or in the requested mapped NSSAI, or in the additional requested NSSAI) are not available/allowed for the UE) is available/allowed for the UE in the UE's RA.

If the S-NSSAI is subject to NSSAA, the AMF may perform NSSAA even if the S-NSSAI is not available in the current RA. After the completion of NSSAA: the AMF:

If NSSAA fails for the S-NSSAI, the AMF includes the S-NSSAI in the rejected NSSAI and sets the cause to "S-NSSAI not available due to the failed or revoked network slice-specific authentication and authorization" or to "S-NSSAI not available in the current registration area". The AMF sends the rejected NSSAI to the UE in the NAS message (e.g. Configuration Update Command message).

If NSSAA succeeds for the S-NSSAI, the AMF includes the S-NSSAI in the rejected NSSAI and sets the cause to "S-NSSAI not available in the current registration area". The AMF sends the rejected NSSAI to the UE in the NAS message (e.g. Configuration Update Command message).

It will be appreciated that solution 2a and/or solution 2b may be combined with any of the options for solutions 1a and 1b, as desired.

3. Further Discussion

Further examples of the present disclosure are now provided. The skilled person would understand how these further examples may relate to one or more of the solutions options mentioned above.

FIG. 1 provides a schematic diagram of the structure of a network entity 100 (for example, an AMF) which is arranged to operate in accordance with one or more of the examples described above. The network entity 100 includes a transmitter 102 arranged to transmit signals to a UE; a receiver 104 arranged to receive signals from a UE; and at least one controller (or processor) 106 arranged to control the transmitter and receiver and to perform processing such as in accordance with the above described methods, and also to communicate with the network. In an embodiment, the network entity 100 may include a transceiver which includes the transmitter 102 and the receiver 104.

Figure 2:
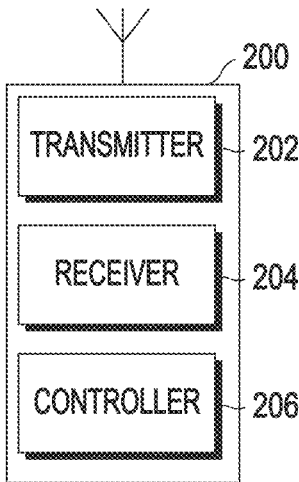
FIG. 2 illustrates an example structure of a UE in accordance with an example of the present disclosure.

FIG. 2 provides a schematic diagram of the structure of a UE 200 which is arranged to operate in accordance with one or more of the examples of the present disclosure described above. The UE 200 includes a transmitter 202 arranged to transmit signals to a network entity; a receiver 204 arranged to receive signals from a network entity; and at least one controller (or processor) 206 arranged to control the transmitter and receiver and to perform processing in accordance with the above described methods. In an embodiment, the UE 200 may include a transceiver which includes the transmitter 202 and the receiver 204.

Although in FIGS. 1 and 2 the transmitter, receiver, and controller (or processor) have been illustrated as separate elements, any single element or plurality of elements which provide equivalent functionality may be used to implement the examples of the present disclosure described above.

Referring to FIG. 3, there is illustrated a method in accordance with various examples of the present disclosure. The method of FIG. 3 may, in certain examples, be performed by a network entity such as that illustrated in FIG. 1. For example, the network entity may be an AMF.

In step 310, while there is a pending NSSAI for a UE, the network entity receives, from the UE, a request indicating at least one first S-NSSAI over a first access technology, the first S-NSSAI being different to any S-NSSAI indicated in the pending NSSAI.

It will be appreciated that the request may be a request to use (for example, to register to) at least one network slice corresponding to the at least one first S-NSSAI over the first access technology. For example, the request may be or include a requested NSSAI (for example, a requested NSSAI IE).

In certain examples, any S-NSSAI indicated in the pending NSSAI may each correspond to a (different) network slice which the UE has previously transmitted a request to use (i.e., a previous/optionally different request to that mentioned above). Upon receiving said previous request, the network entity may have determined that one or more S-NSSAI included therein is/are subject to NSSAA and may therefore have added such one or more S-NSSAI to the pending NSSAI.

In certain examples, the UE may be prohibited, or prevented, from including, in a request to use a slice (such as the request mentioned in relation to step 310) any S-NSSAI(s) which are indicated in the pending NSSAI. That is, a request for using a network slice may not be able to indicate a S-NSSAI which is included in a pending NSSAI.

In certain examples, when the request is received by the network entity, NSSAA for one or more S-NSSAI included in the pending NSSAI at the UE at the time the UE transmitted the request may have been completed (e.g., NSSAA is successful). Here, the pending NSSAI for the UE at the network entity may be, or have been, updated to remove the indication of these one or more S-NSSAI for which NSSAA is completed. The UE may not have been informed of this yet, however, in which case the pending NSSAI at the UE still includes said indication. In the event that the network entity transmits a response to the request, the response may include an indication that NSSAA has been completed for the one or more of the S-NSSAI which are still indicated in the pending NSSAI at the UE, thereby informing the UE of this. For example, the network entity may transmit a (updated) pending NSSAI and an allowed NSSAI to the UE, where information for the one or more of the second S-NSSAI for which NSSAA has succeeded has been removed from the pending NSSAI and the allowed NSSAI indicates these one or more of the second S-NSSAI.

In certain examples if NSSAA has succeeded and the AMF has locally moved the S-NSSAI to the allowed NSSAI, and if the request from the UE is considered to be new (e.g., does not indicate any S-NSSAI indicated in a previous request), the AMF may remove the S-NSSAI, for which NSSAA has succeeded, from the allowed NSSAI. This is because the AMF may consider the first request to contain S-NSSAI entries that are mutually exclusive from those in the second request.

Similarly, if NSSAA failed for any of the S-NSSAI which were in the pending NSSAI at the UE at the time the UE transmitted the request, the network entity may remove information for such S-NSSAI from the pending NSSAI and add an indication for these S-NSSAI to a rejected NSSAI; this rejected NSSAI may also be transmitted to the UE to inform the UE of rejection of a request to use the slices(s) corresponding to these S-NSSAI.

It will be appreciated that the request for at least one first S-NSSAI may, in certain examples, include information on the at least one first S-NSSAI, or an indication of each of the first S-NSSAI, such that the network entity is informed of the network slice(s) that the UE wants to use. Herein, it will be appreciated that, where reference is made to an indication of an S-NSSAI or at least one S-NSSAI (or similar), said indication may be, or include, the S-NSSAI itself/themselves, or may include a plurality of separate indications each indicating one of the S-NSSAI in some suitable manner (such as by providing or including the relevant S-NSSAI itself).

In step 320, it is essentially determined (or verified, checked etc.) whether the pending NSSAI includes an indication(s) of one or more S-NSSAI which were indicated in a previous request, received from the UE, over the first access technology. That is, it is checked whether the pending NSSAI includes an indication(s) of one or more S-NSSAI which were indicated in a request previously transmitted to the network entity by the UE, where this previously transmitted request was for using the network slice(s) corresponding to the one or more S-NSSAI over the same access technology as the more-recent request received from the UE. The indication(s) of one or more S-NSSAI over the first access technology in the pending NSSAI may include all S-NSSAI in the pending NSSAI which are/were requested over the first access technology.

Additionally or alternatively, the network entity may determine (or verify, check etc.) whether the pending NSSAI includes an indication of any S-NSSAI which were previously requested over a different access technology (i.e., a second access technology different to the first access technology). For instance, such S-NSSAI may have been indicated in a/another request previously transmitted to the network entity by the UE, where this previously transmitted request was for using the network slice(s) corresponding to such S-NSSAI over an access technology which is different to the first access technology.

In step 330, if the pending NSSAI includes an indication of one or more S-NSSAI which were indicated in a previous request from the UE over the first access technology, the network entity assumes that the request is for using at least one new network slice. In certain examples, the assumption that the request is for using at least one new network slice may also require that the pending S-NSSAI does not include any S-NSSAI (or any indication thereof) which were previously requested by the UE over a different access technology to the first access technology.

Following this, in step 340, the network entity removes the indication(s) of the one or more S-NSSAI from the pending NSSAI. For example, an indication(s), in the pending NSSAI, of any S-NSSAI over the first access technology, which were indicated to the network entity in the previous request from the UE, are removed from the pending NSSAI. It will be appreciated that, in certain examples, this can be seen to reflect the request being a request for using a new network slice, and in particular a new network slice over the first access technology. In certain example, it may be seen that the request for using a new network slice over an access technology is interpreted, by the network entity, to mean that a previous request over the same access technology is no longer valid.

Additionally or alternatively or optionally, step 330 may be considered to include an operation of determining whether an S-NSSAI indicated in the pending NSSAI, when the request is received, is to be removed, based on the access technology over which use of said S-NSSAI was requested. If the access technology over which use of said S-NSSAI in the pending NSSAI was requested is the first access technology, the method proceeds to step 340 in which the indication of said S-NSSAI is removed from the pending NSSAI. If, however, the access technology over which use of said S-NSSAI in the pending NSSAI was requested is a different access technology to the first access technology, the indication of said S-NSSAI is not removed from the pending NSSAI.

Although not shown in FIG. 3, it will be appreciated that the network entity may transmit a response to the first request, in certain examples.

For instance, a described further above, the network entity may transmit an (updated) pending NSSAI to the UE, in which one or more of the at least one first S-NSSAI are indicated, the one or more of the first S-NSSAI corresponding to slices for which NSSAA is required. Alternatively, the network entity may transmit an additional pending NSSAI to the UE (where this may be a new IE), in which said one or more of the first S-NSSAI are indicated.

As another example, as described above, the network entity may also transmit an allowed NSSAI to the UE, where this may be modified based on the request; for example, to include an indication of one or more of the at least one first S-NSSAI to which the UE is allowed to register. Alternatively, the network entity may transmit an additional allowed NSSAI to the UE, which may be configured to include the indication of the one or more of the first S-NSSAI.

As yet another example, as described above, the network entity may also transmit a rejected NSSAI to the UE, where this may be modified, or generated, based on the request; for example, to include an indication of one or more of the at least one first S-NSSAI for which the request for usage (e.g., a request to register) from the UE is rejected. Alternatively, some other signal for indicating the one or more of the first S-NSSAI for which the UE registration is rejected may be sent to the UE.

It will be appreciated that one or more of the signals/messages transmitted in response to the request may be sent in a single signal. For example, in a registration accept message, or in a CUC (Configuration Update Command) message.

Referring now to FIG. 4, there is illustrated a method of a UE in accordance with various examples of the present disclosure. It will be appreciated that the method may be performed by a UE such as illustrated in FIG. 2. It will also be appreciated that examples of the method of FIG. 4 may interrelate with examples of the method of FIG. 3.

In step 410, while there is a pending NSSAI for a UE, the UE transmits, to a network entity, a request indicating at least one first S-NSSAI over a first access technology, wherein the at least one first S-NSSAI are different to any S-NSSAI indicated in the pending NSSAI.

If the pending NSSAI includes an indication of one or more S-NSSAI over the first access technology, which were indicated in a previous request transmitted by the UE, the request is a request for using at least one new network slice. That is, where the at least one first S-NSSAI are different to any S-NSSAI indicated in the pending NSSAI, and where the request is sent over the same access technology as a previous request which indicated one or more S-NSSAI indicated in the pending NSSAI, the request is considered to be a request to use new network slices.

FIG. 4 also shows a step 420 of receiving a response to the request from the network entity, however it will be appreciated that this step may be omitted for certain examples of the present disclosure. This step 420 may be useful for further examples in which the contents of said response are used by the UE. For example, the response may include (separately or altogether), a pending NSSAI, an additional pending NSSAI, an allowed NSSAI, an additional allowed NSSAI, and/or a rejected NSSAI.

The pending NSSAI and the additional pending NSSAI may include an indication of one or more of the first S-NSSAI which are subject to NSSAA. The UE may use this to update the pending NSSAI at the UE to include the indication.

The allowed NSSAI may include an indication of any S-NSSAI previously allowed for the UE and an indication of any of the first S-NSSAI which are allowed for the UE, while the additional allowed NSSAI may include the indication of any of the first S-NSSAI which are allowed for the UE.

The rejected NSSAI may include an indication of any of the first S-NSSAI which are not allowed for the UE or which are not available in the current registration area of the UE.

Referring now to FIG. 5, there is illustrated a method of a network entity in accordance with various examples of the present disclosure. It will be appreciated that the method may be performed by a network entity such as illustrated in FIG. 1. For example, the network entity may be an AMF.

In step 510, while there is a pending NSSAI for a UE, the network entity receives, from the UE, a request indicating at least one S-NSSAI.

In step 520, the network entity determines whether the request is for using at least one additional network slice.

In certain examples, this determination is performed based on the request. For example, if the request is, or includes, a requested NSSAI (e.g., a requested NSSAI IE), then the network entity is configured to consider the request to be for using additional network slice(s). As another example, if the request is, or includes, an additional requested NSSAI (e.g., a requested additional NSSAI IE), then the network entity is configured to consider the request to be for using additional network slice(s).

In certain examples, the UE may transmit an indication, either in the request or separately, that the request indicating the at least one first S-NSSAI is a request for using at least one additional network slices. When receiving such an indication, the network entity may be configured to assume that the request is for using (for example, registering to) at least one additional network slice. The indication may be received in addition to a requested NSSAI or an additional requested NSSAI.

In certain examples, as a result of the request being for requesting use of at least one additional slice, the network entity may not remove any S-NSSAI (for which NSSAA is still ongoing or pending) from the pending NSSAI. The network entity may, however, add, to the pending NSSAI, an indication of any of the requested first S-NSSAI which are subject to NSSAA. In certain examples, the network entity may then transmit this pending NSSAI to the UE, or may include this indication in an additional pending NSSAI and send this additional pending NSSAI to the UE.

In certain examples, the network entity may also determine if any of the first S-NSSAI are allowed for the UE. The network entity may include any allowed first S-NSSAI in an allowed NSSAI (or in an additional allowed NSSAI) and transmit this to the UE. In certain examples, the network entity may determine if any of the first S-NSSAI are rejected for the UE (for example, for one or more of the reasons for rejection as are discussed throughout the present disclosure). The network entity may include any rejected first S-NSSAI in a rejected NSSAI, and transmit this to the UE.

Referring now to FIG. 6, there is illustrated a method of a UE in accordance with various examples of the present disclosure. It will be appreciated that the method may be performed by a UE such as illustrated in FIG. 2. It will also be appreciated that examples of the method of FIG. 6 may interrelate with examples of the method of FIG. 5.

In step 610, while there is a pending NSSAI for a UE, the UE transmits, to a network entity, a first request for using at least one additional network slice, the first request indicating at least one S-NSSAI; or the UE transmits, to the network entity, a second request for using at least one network slice corresponding to an S-NSSAI indicated in the pending NSSAI over a different access technology. For example, the second request may be a (new) bit, as discussed above for Option 1 of Solution 1b.

It will be appreciated that, in certain examples, this may be achieved by request being, or including, a requested NSSAI (e.g., a requested NSSAI IE), then the network entity is configured to consider the request to be for using additional network slice(s). As another example, if the request is, or includes, an additional requested NSSAI (e.g., a requested additional NSSAI IE), then the network entity is configured to consider the request to be for using additional network slice(s). Furthermore, in certain examples, the UE may transmit an indication, either in the request or separately, that the request indicating the at least one first S-NSSAI is a request for using at least one additional network slices. When receiving such an indication, the network entity may be configured to assume that the request is for using (for example, registering to) at least one additional network slice. The indication may be transmitted in addition to a requested NSSAI or an additional requested NSSAI.

FIG. 6 also shows a step 620 of receiving a response to the request from the network entity, however it will be appreciated that this step may be omitted for certain examples of the present disclosure. This step 620 may be useful for further examples in which the contents of said response are used. For example, the response may include (separately or altogether), a pending NSSAI, an additional pending NSSAI, an allowed NSSAI, an additional allowed NSSAI, and/or a rejected NSSAI. These, and their usage, is discussed above in relation to the method of FIG. 5.

Figure 7:
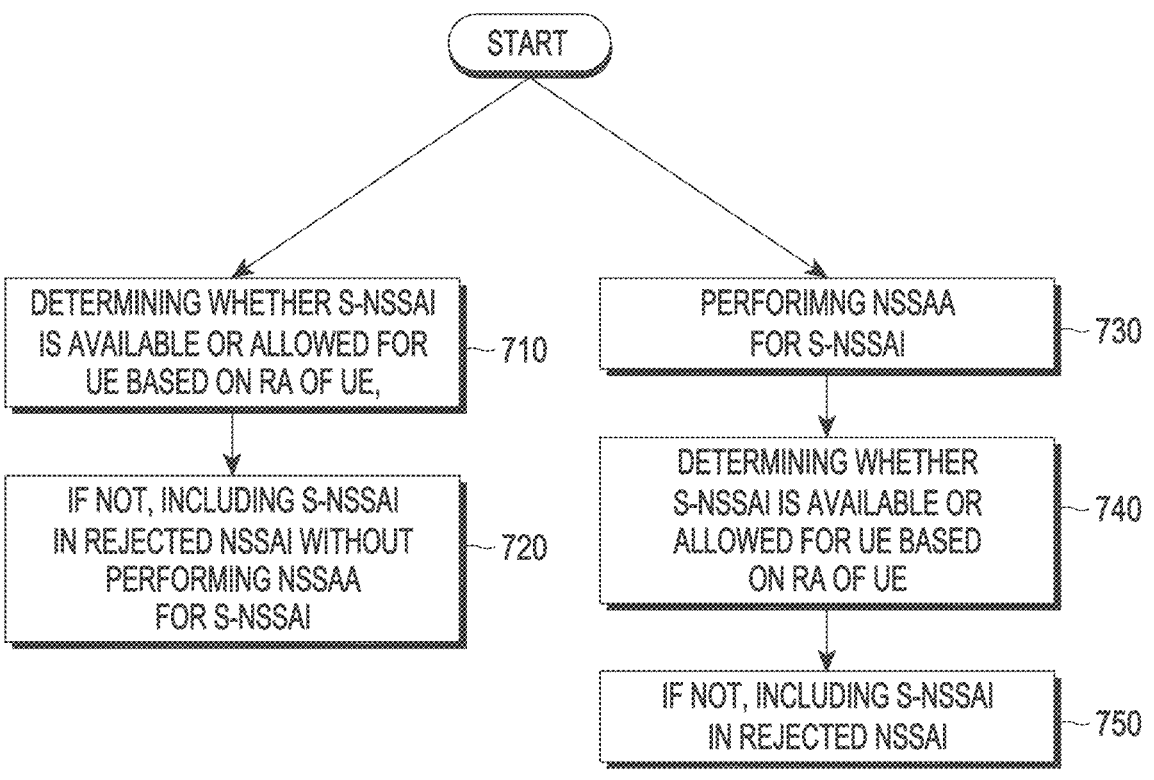
FIG. 7 illustrates a method of a network entity in accordance with another example of the present disclosure.

Referring now to FIG. 7, there is illustrated another method in accordance with various examples of the present disclosure.

The method of FIG. 7 may, in certain examples, be performed by a network entity such as that illustrated in FIG. 1. For example, the network entity may be an AMF.

In certain examples, FIG. 7 begins with the network entity being in a state in which it is to determine whether access to a network slice is allowed for a UE. In certain examples, this may follow the receiving of a request to use said network slice from the UE, or it may be the case that said network slice is marked as default in the subscription of the UE. Following this, the network entity is configured to perform one or two procedures. It will be appreciated that the present disclosure includes a network entity configured to perform only one of these procedures and a network entity configured to perform both (and, for example, configured to switch between either procedure at will or in response to some factor or condition).

In step 710, the network entity determines/identifies whether a S-NSSAI is available or allowed for a UE based on a registration area (RA) of the UE. In certain examples, the determination may include checking whether the S-NS-SAI is available or allowed in the current registration area of the UE.

In certain examples, (not shown in FIG. 7), if the S-NS-SAI is available or allowed for the UE, then the network entity may proceed as described in [3]. For example, the network entity may check whether the S-NSSAI is subject to NSSAA and, depending on the outcome of this, include the S-NSSAI in a pending NSSIA, in an allowed NSSAI or in a rejected NSSAI.

However, in step 720, if the S-NSSAI is determined to not be available or to not be allowed for the UE based on the RA of the UE, the network entity includes the S-NSSAI in a rejected NSSAI without performing NSSAA for the S-NS-SAI. In certain examples, the network entity may indicate, as the reason for rejection, that the S-NSSAI is not available in the RA of the UE. That is, the network entity may configure an indication showing the cause for rejection being that the S-NSSAI is not available in the current RA of the UE.

In step 730, as an alternative to step 710, the network entity may perform NSSAA for the S-NSAI.

In step 740, the network entity then determines whether the S-NSSAI is available or allowed for the UE based on the RA of the UE. It will be appreciated that this may be carried out regardless of the outcome of the NSSAA, in certain examples.

In step 750, if it is determined that the S-NSSAI is not available or not allowed for the UE based on the RA of the UE, the S-NSSAI is included in a rejected NSSAI. For example, if the S-NSSAI is not available in the RA of the UE, the S-NSSAI may be included in the rejected NSSAI. In certain examples, the network entity may also indicate, as the reason for rejection, that the S-NSSAI is not available in the RA of the UE. That is, the network entity may configure an indication showing the cause for rejection being that the S-NSSAI is not available in the current RA of the UE.

In certain examples (not shown in FIG. 7), the network entity, for either alternative, may then transmit the rejected NSSAI to the UE and/or transmit the reason for rejection (or the indication thereof) to the UE.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

The invention claimed is:

1. A user equipment (UE) in a wireless communication system, the UE comprising:
   a transceiver; and
   at least one processor configured to:
     transmit, to a network entity, a request message including requested network slice selection assistance information (NSSAI) including at least one first single NSSAI (S-NSSAI) over a first access type, wherein the at least one first S-NSSAI is subject to network slice-specific authentication and authorization (NSSAA), the requested NSSAI does not include any S-NSSAI in a first pending NSSAI for the UE, and the first pending NSSAI includes at least one second S-NSSAI, and
     receive, from the network entity, an accept message including a second pending NSSAI including the at least one first S-NSSAI and the at least one second S-NSSAI.

2. A network entity in a wireless communication system, the network entity comprising:
   a transceiver; and
   at least one processor configured to:
     receive, from a user equipment (UE), a request message including requested network slice selection assistance information (NSSAI) including at least one first single NSSAI (S-NSSAI) over a first access type, wherein the at least one first S-NSSAI is subject to network slice-specific authentication and authorization (NSSAA), the requested NSSAI does not include any S-NSSAI in a first pending NSSAI for the UE, and the first pending NSSAI includes at least one second S-NSSAI, and
     transmit, to the UE, an accept message including a second pending NSSAI including the at least one first S-NSSAI and the at least one second S-NSSAI.

3. The UE of claim 1, wherein the at least one second S-NSSAI in the first pending NSSAI was requested by the UE over the first access type.

4. The network entity of claim 2, wherein the at least one second S-NSSAI in the first pending NSSAI was requested by the UE over the first access type.

5. A method performed by a user equipment (UE) in a wireless communication system, the method comprising:

transmitting, to a network entity, a request message including requested network slice selection assistance information (NSSAI) including at least one first single NSSAI (S-NSSAI) over a first access type, wherein the at least one first S-NSSAI is subject to network slice-specific authentication and authorization (NSSAA), the requested NSSAI does not include any S-NSSAI in a first pending NSSAI for the UE, and the first pending NSSAI includes at least one second S-NSSAI; and receiving, from the network entity, an accept message including a second pending NSSAI including the at least one first S-NSSAI and the at least one second S-NSSAI.

6. The method of claim 5, wherein the at least one second S-NSSAI in the first pending NSSAI was requested by the UE over the first access type.

7. A method performed by a network entity in a wireless communication system, the method comprising:

receiving, from a user equipment (UE), a request message including requested network slice selection assistance information (NSSAI) including at least one first single NSSAI (S-NSSAI) over a first access type, wherein the at least one first S-NSSAI is subject to network slice-specific authentication and authorization (NSSAA), the requested NSSAI does not include any S-NSSAI in a first pending NSSAI for the UE, and the first pending NSSAI includes at least one second S-NSSAI; and transmitting, to the UE, an accept message including a second pending NSSAI including the at least one first S-NSSAI and the at least one second S-NSSAI.

8. The method of claim 7, wherein the at least one second S-NSSAI in the first pending NSSAI was requested by the UE over the first access type.

* * * * *